(12) United States Patent
Stallings et al.

(10) Patent No.: US 8,381,245 B2
(45) Date of Patent: Feb. 19, 2013

(54) PROGRAM GUIDE IMAGE OBJECTS FOR MEDIA CONTENT ACCESS SYSTEMS AND METHODS

(75) Inventors: Heath Stallings, Colleyville, TX (US); Brian Roberts, Frisco, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 581 days.

(21) Appl. No.: 11/960,008

(22) Filed: Dec. 19, 2007

(65) Prior Publication Data
US 2009/0165046 A1 Jun. 25, 2009

(51) Int. Cl.
*H04N 5/445* (2011.01)
*G06F 3/00* (2006.01)

(52) U.S. Cl. ............... 725/40; 725/47; 725/52; 715/716

(58) Field of Classification Search ............... 725/39, 725/40, 47, 52; 715/716
See application file for complete search history.

(56) References Cited

U.S. PATENT DOCUMENTS

| | | | |
|---|---|---|---|
| 5,633,683 A * | 5/1997 | Rosengren et al. | 375/240.01 |
| 5,822,014 A * | 10/1998 | Steyer et al. | 725/41 |
| 7,174,512 B2 * | 2/2007 | Martin et al. | 715/719 |
| 7,802,284 B2 * | 9/2010 | Kim | 725/44 |
| 2002/0067376 A1 * | 6/2002 | Martin et al. | 345/810 |
| 2004/0133910 A1 * | 7/2004 | Gordon et al. | 725/37 |
| 2006/0107304 A1 * | 5/2006 | Cleron et al. | 725/135 |
| 2007/0162936 A1 * | 7/2007 | Stallings et al. | 725/58 |
| 2009/0031343 A1 * | 1/2009 | Sharkey | 725/39 |
| 2009/0165046 A1 * | 6/2009 | Stallings et al. | 725/39 |
| 2010/0153999 A1 * | 6/2010 | Yates | 725/39 |

FOREIGN PATENT DOCUMENTS

EP 1126701 A1 * 8/2001

OTHER PUBLICATIONS

International Search Report and Written Opinion received in International Application No. PCT/US2008/085007, Jun. 1, 2009.

* cited by examiner

*Primary Examiner* — James R Sheleheda

(57) ABSTRACT

An exemplary system includes a media content processing subsystem configured to provide a program guide including a matrix of cells associated with a plurality of media content instances, and a selector object within the program guide. The selector object is configured to select one of the cells such that the cells in the matrix include a selected cell and at least one unselected cell. The subsystem is further configured to provide at least one image object within the at least one unselected cell. The image object represents the media content instance associated with the unselected cell. In certain embodiments, the image object includes a video content stream. The subsystem is further configured to provide a graphical user interface to a display for presentation to a user, the graphical user interface including at least a portion of the program guide and the image object.

26 Claims, 12 Drawing Sheets

PROGRAM GUIDE IMAGE OBJECTS FOR MEDIA CONTENT ACCESS SYSTEMS AND METHODS

BACKGROUND INFORMATION

The set-top box ("STB") has become an important computing device for accessing media content services and the media content within those services. An STB is usually configured to provide users with access to a large number and variety of media content choices offered by a provider. For example, a user may choose to experience a variety of broadcast television programs, pay-per-view services, video-on-demand programming, Internet services, and audio programming via an STB.

The large number of media content choices offered by providers can make it difficult for a user of an STB to find and select desired media content. On-screen program guides have alleviated this problem to some degree. As the services and media content choices provided to users (e.g., more media channels) have expanded, developers of program guides have attempted to keep pace by expanding the features and capabilities of the program guides.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

Exemplary apparatuses, systems, and methods for providing one or more program guide image objects are disclosed herein. Image objects may include any visual images, graphics, and/or other image content (collectively referred to as "image content") representing media content instances associated with cells of a program guide. Examples of image objects will be described further below.

In certain embodiments, a media content processing subsystem (e.g., a set-top box) may be configured to provide a program guide including a matrix of cells associated with a plurality of media content instances. The media content processing subsystem may be further configured to provide a selector object within the program guide. The selector object may be used to select one of the cells in the matrix, thereby leaving at least one unselected cell within the matrix. The media content processing subsystem may be further configured to provide at least one image object within at least one of the unselected cells. Each image object may represent a media content instance associated with the object's corresponding unselected cell. In certain embodiments, the media content processing subsystem may be configured to provide a graphical user interface to a display for presentation to a user. The graphical user interface may include at least a portion of the program guide and the image object(s) placed within the program guide.

In certain embodiments, image objects may include video image content representing the media content instances associated therewith. The video image content may include one or more "live" or "nearly live" video image streams, which will be described in more detail further below. In certain embodiments, the image objects and content within the image objects may be selectively placed in the program guide based on a placement heuristic, examples of which will be described below.

The image objects may enable a user to view image content (including video image content) representative of one or more media content instances in a program guide view. The image content may be displayed not solely for an active cell in the program guide, i.e., a cell selected by the selector object, but for one or more inactive cells in the program guide, i.e., cells not selected by the selector object.

Components and functions of exemplary media content access apparatuses, systems, and methods will now be described in more detail.

Figure 1:
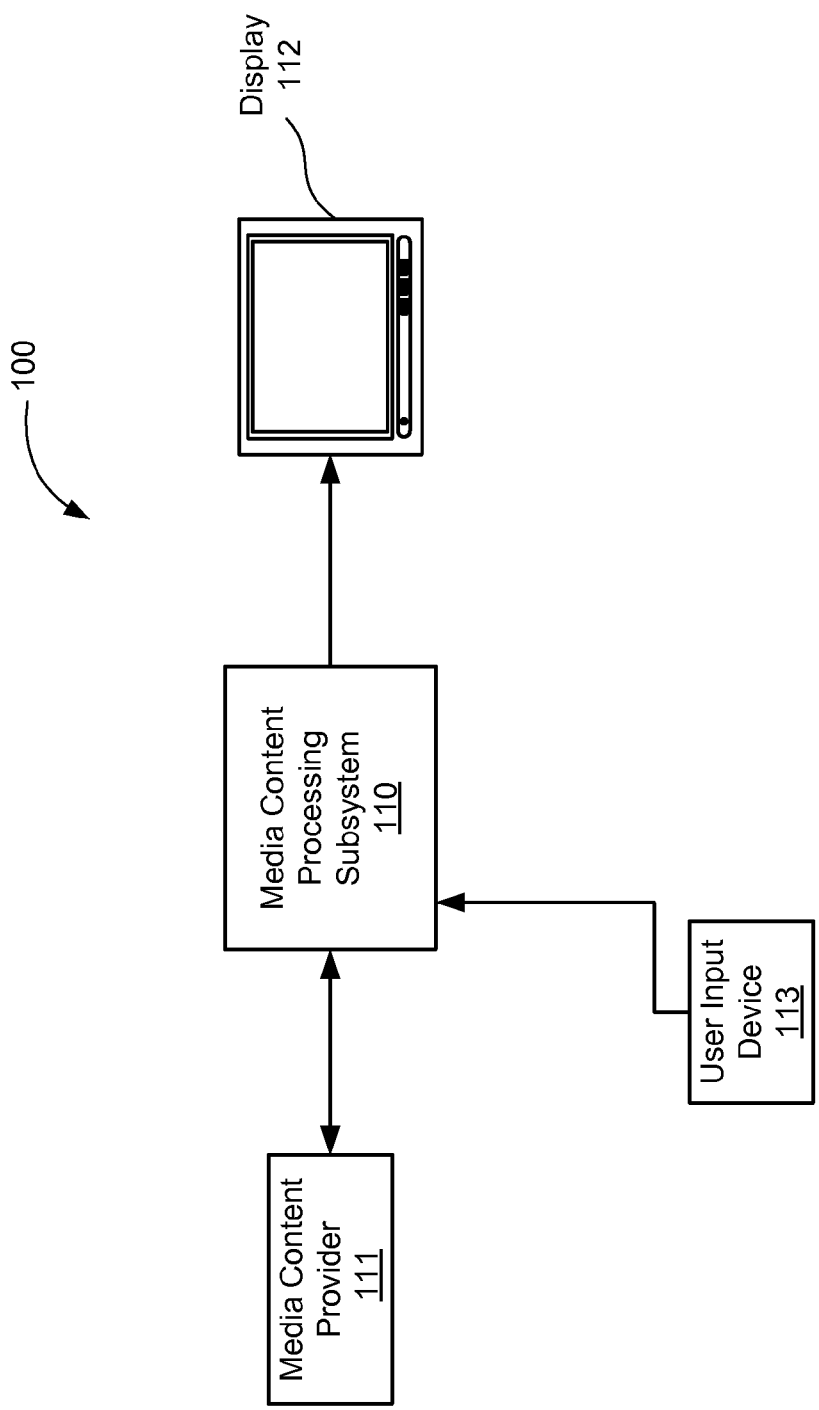
FIG. 1 illustrates an example of a media content access system.

FIG. 1 illustrates an exemplary media content access system 100 (or simply "system 100"). As shown in FIG. 1, system 100 may include a media content processing subsystem 110, which may be configured to communicate with and receive a signal or data stream containing data representative of media content and/or program guide data from a media content provider 111. Media content processing subsystem 110 and media content provider 111 may communicate using any known communication technologies, devices, networks, media, and protocols supportive of remote data communications, including, but not limited to, cable networks, subscriber television networks, satellite networks, the Internet, intranets, local area networks, wireless networks (e.g., Wi-Fi and/or mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications networks and technologies.

Media content processing subsystem 110 may be configured to process a media content stream provided by media content provider 111, including causing a media content instance, or one or more components (e.g., video and/or audio components) of a media content instance, to be presented for experiencing (e.g., viewing) by a user. Presentation of the media content instance may include, but is not limited to, displaying, playing back, or otherwise processing the media content instance, or one or more components of the media content instance, such that the media content instance may be experienced by the user. For example, media content processing subsystem 110 may provide one or more signals to a display 112 (e.g., a television, computer monitor, etc.) so that the display 112 may present (e.g., display) media content for experiencing by the user.

Media content processing subsystem 110 may be configured to process program guide data provided by media content provider 111, including generating and providing a program guide graphical user interface ("GUI") for presentation to the user. For example, media content processing subsystem 110 may provide one or more signals to the display 112 so that the display 112 may present the program guide GUI to the user. The program guide GUI may include a matrix of cells associated with media content instances and one or more image objects associated with (e.g., located within) one or more of the cells, as described further below.

Media content processing subsystem 110 may be at least partially controlled by a user input device 113 (e.g., a remote control device). In certain examples, user input device 113 may include input mechanisms by which a user can utilize features and/or services provided by media content processing subsystem 110. For example, a user may utilize user input device 113 to navigate a program guide (e.g., move a selector object within the program guide) and view and/or select image objects included in the program guide.

While an exemplary media content access system 100 is shown in FIG. 1, the exemplary components illustrated in FIG. 1 are not intended to be limiting. Additional or alternative components and/or implementations may be used. Components of system 100 will now be described in additional detail.

Media content provider 111 may be configured to provide various types of media content and/or program guide data to media content processing subsystem 110 using any suitable communication technologies, including any of those disclosed herein. The media content may include one or more media content instances, or one or more segments of the media content instance(s). The term "media content instance" as used herein refers generally to any television program, on demand program, pay-per-view program, broadcast media program, IPTV content, commercial, advertisement, video, movie, song, video game, image, photograph, sound, or any segment, component, or combination of these or other forms of media content that may be viewed or otherwise experienced by a user.

The program guide data may include any information descriptive of content channels, programming time slots, media content instances, metadata for the media content instances, and relationships between the content channels, time slots, and media content instances. The term "content channel" will be used herein to refer generally to any carrier of media content, including, but not limited to, media (e.g., television) channels, streams, addresses, frequencies or other carriers of media content. The term "programming time slot" will be used herein to refer generally to any period of time associated with a scheduled transmission (e.g., broadcast) of media content. Typically, the program guide data is descriptive of a programming schedule, including media content instances and the time slots and content channels associated with scheduled transmission of the media content instances. Examples of program guides and program guide views presenting program guide data and image objects will be described in more detail below.

Figure 2:
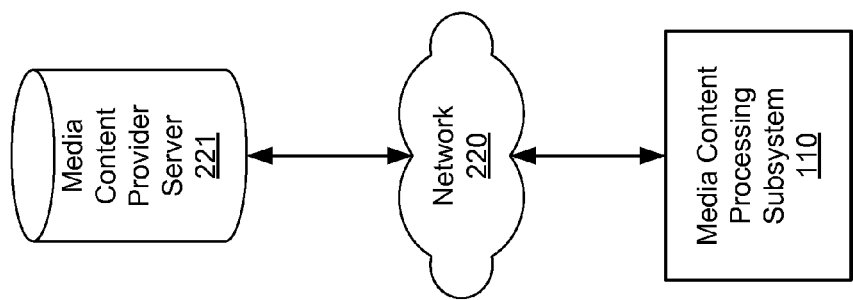
FIG. 2 illustrates an exemplary media content provider network.

An exemplary media content provider 111 may include a media content provider server 221, as shown in FIG. 2. Media content provider server 221 may be configured to communicate with media content processing subsystem 110 via one or more types of networks 220 (and communications links thereto). Network 220 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo network), an optical fiber network, any other suitable network, and any combination of these networks. In some alternative examples, media content processing subsystem 110 may be connected directly to media content provider server 221.

Figure 3:
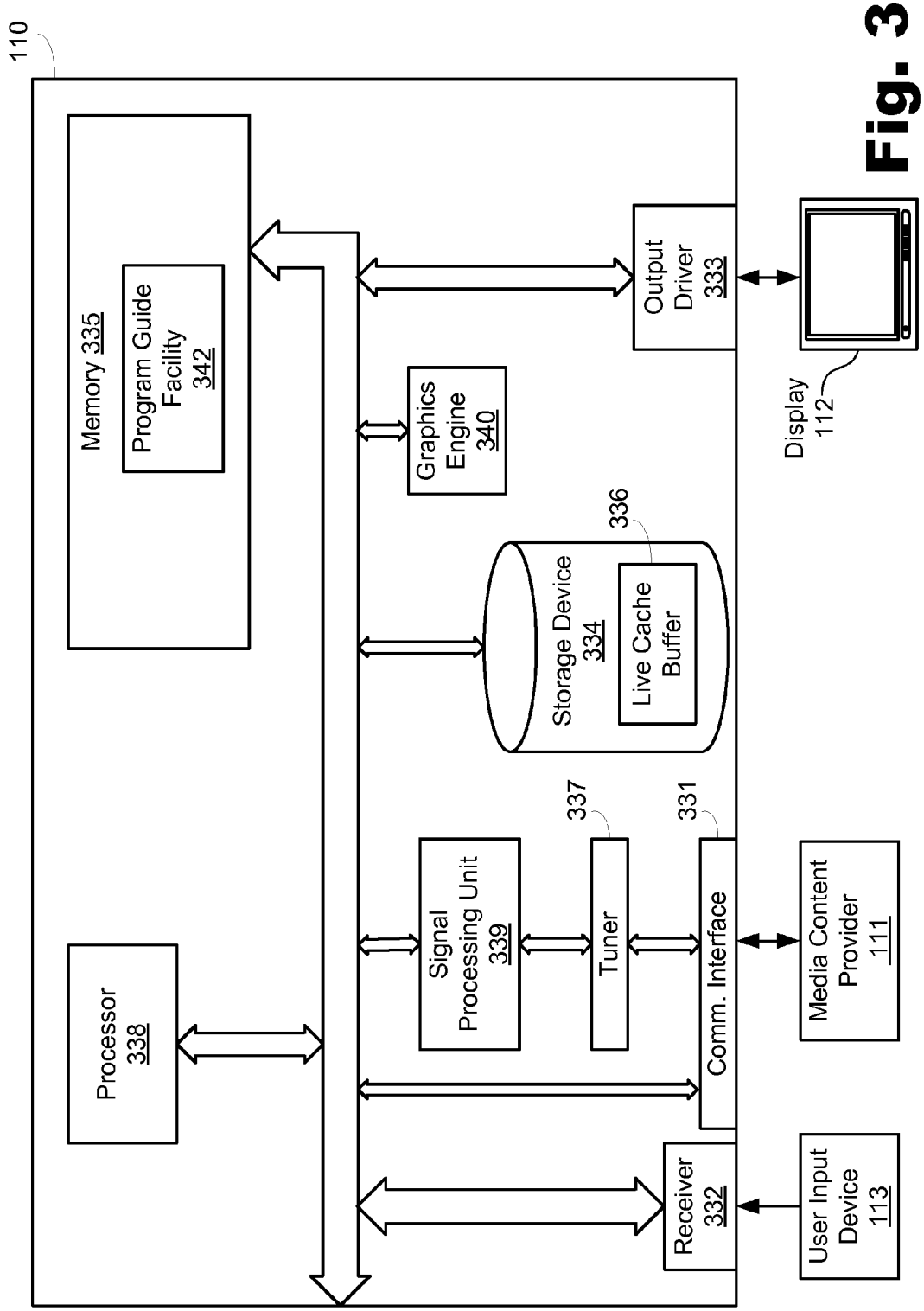
FIG. 3 illustrates an exemplary media content processing subsystem.

FIG. 3 illustrates exemplary components of media content processing subsystem 110 (or simply "processing subsystem 110"). Processing subsystem 110 may include any hardware, software, and firmware, or combination or sub-combination thereof, configured to process media content and/or program guide data for presentation to a user. The media content and/or program guide data may be received from media content provider 111 and provided to display 112 for presentation to the user. As used herein and in the appended claims, unless otherwise specifically denoted, the terms "media content processing subsystem" and "processing subsystem" refer expansively to all possible receivers configured to receive and process digital and/or analog media content, as well as program guide data. Processing subsystem 110 may include, but is not limited to, a set-top box ("STB"), home communication terminal ("HCT"), digital home communication terminal ("DHCT"), stand-alone personal video recorder ("PVR"), DVD player, handheld entertainment device, gaming device, video-enabled phone (e.g., a mobile phone), and personal computer.

In certain embodiments, processing subsystem 110 may include any computer hardware and/or instructions (e.g., software), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems, including, but by no means limited to, known versions and/or varieties of Microsoft Windows, UNIX, Macintosh, and Linux operating systems.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Additional or alternative components and/or implementations may be used in other embodiments. Components of the processing subsystem 110 will now be described in additional detail.

As shown in FIG. 3, processing subsystem 110 may include a communication interface 331 configured to receive content (e.g., media content) and/or data (e.g., program guide data) in any acceptable format (e.g., streamed data) from media content provider 111 or from any other suitable content source. Communication interface 331 may include any device, logic, and/or other technologies suitable for receiving signals and/or data representative of media content and/or other types of content or data. Communication interface 331 may be configured to interface with any suitable communication media, protocols, and formats, including any of those mentioned above.

Processing subsystem 110 may also include a receiver 332 configured to receive user input signals (e.g., program guide navigation commands) from user input device 113. User input device 113 may include, for example, a remote control device or any other suitable input device and may be configured to communicate with receiver 332 via a wireless link (e.g., an infrared ("IR") or radio frequency ("RF") link), electrical connection, or any other suitable communication link.

Figure 4:
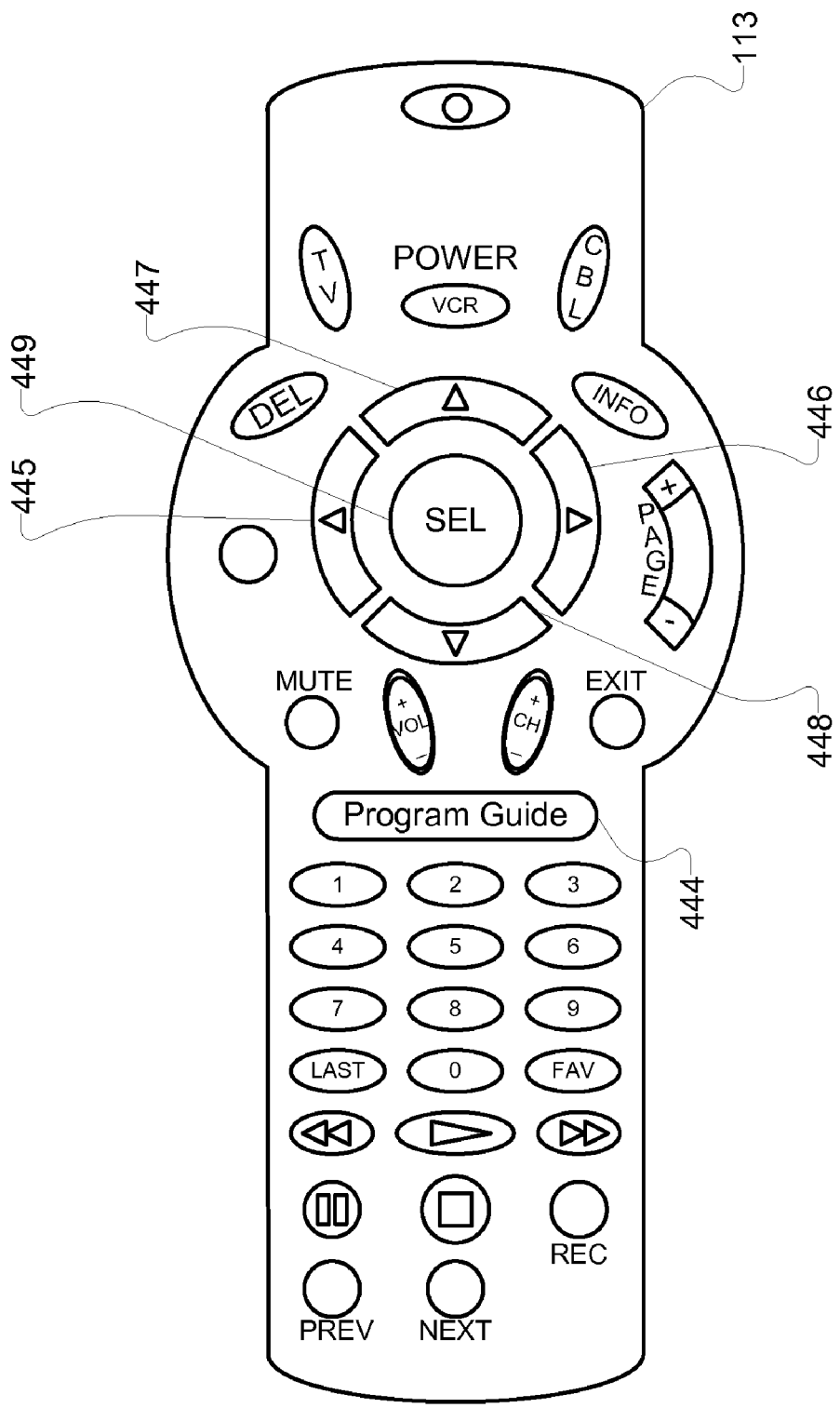
FIG. 4 illustrates an exemplary remote control user input device.

An exemplary remote control user input device 113 is illustrated in FIG. 4. In some examples, input device 113 may be configured to enable a user to control viewing options for experiencing media content and/or considering program guide data provided by processing subsystem 110. A program guide button 444 may be configured to evoke a presentation of a program guide GUI on display 112. A left button 445, right button 446, up button 447, down button 448, and select button 449 may be included and configured to enable the user to evoke and/or navigate through various views, options, and graphical user interfaces displayed by display 112. For example, buttons 445-448 may be configured to enable a user to navigate a selector object to different locations in a program guide. Input device 113 shown in FIG. 4 is merely illustrative of one of the many different types of user input devices that may be used to in connection with processing subsystem.

Returning to FIG. 3, processing subsystem 110 may include an output driver 333 configured to interface with or drive display 112. As instructed by one or more processors of the processing subsystem 110, output driver 333 may provide output signals to display 112, the output signals including content (e.g., media content and/or program guide content) to be presented by display 112 for experiencing by a user. For example, output driver 333 may provide a program guide GUI including a program guide view to display 112 for presentation to the user. Output driver 333 may include any combination of hardware, software, and/or firmware as may serve a particular application.

Storage device 334 may include one or more data storage media, devices, or configurations and may employ any type, form, and combination of storage media. For example, storage device 334 may include, but is not limited to, a hard drive, network drive, flash drive, magnetic disc, optical disc, or other non-volatile storage unit. Media content, program guide data, images representative of media content instances, and other data may be temporarily and/or permanently stored in storage device 334.

Storage device 334 is shown to be a part of the processing subsystem 110 in FIG. 3 for illustrative purposes only. It will be understood that storage device 334 may additionally or alternatively be located external to processing subsystem 110.

Processing subsystem 110 may include memory 335. Memory 335 may include, but is not limited to, FLASH memory, random access memory ("RAM"), dynamic RAM ("DRAM"), other suitable computer-readable media, or any combination or sub-combination thereof. In some examples, various facilities (e.g., a program guide facility 342) used by the processing subsystem 110 may reside in memory 335.

Storage device 334 may include one or more live cache buffers 336. Live cache buffer 336 may additionally or alternatively reside in memory 335 or in a storage device external to processing subsystem 110. In some examples, media content and/or program guide data may be temporarily stored in live cache buffer 336 (i.e., buffered) to facilitate buffered viewing of the media content and/or program guide data.

Tuner 337 may be configured to selectively receive content (e.g., media content) carried on a particular content channel. For example, tuner 337 may be tuned to a particular content channel such that the content carried on the content channel is received and may be processed by processing subsystem 110.

In some examples, processing subsystem 110 may include multiple tuners 337 such that content carried on different content channels may be concurrently received by the processing subsystem 110. For example, processing subsystem 110 may include a first tuner configured to receive content carried on an analog video signal and a second tuner configured to simultaneously receive content carried on a digital compressed signal.

In some examples, media content received at the tuner 337 is temporarily buffered, or stored, in the live cache buffer 336. If there are multiple tuners 337, there may be a live cache buffer 336 corresponding to each of the tuners 337.

While tuner 337 may be used to receive various types of content-carrying signals transmitted by media content provider 111, processing subsystem 110 may be configured to receive other types of content signals (including media content signals and/or program guide data signals) from media content provider 111 and/or other sources without using a tuner. For example, media content provider 111 may broadcast digital streams of data packets (e.g., Internet Protocol ("IP") based data packets) that can be received without using a tuner. For such types of content signals, communication interface 331 may receive and forward the signals directly to other components of processing subsystem 110 (e.g., processor 338 or signal processing unit 339) without the signals going through tuner 337. For an IP-based signal, for example, signal processing unit 339 may function as an IP receiver.

Streams of content received by communication interface 331 may be used to populate image objects in a program guide. Accordingly, and as will be described in more detail further below, image objects may include "live" or "nearly live" content, including video content that is being transmitted by media content provider 111 and received by communication interface 331.

Processing subsystem 110 may include at least one processor, such as processor 338, configured to control operations of processing subsystem 110. Processing subsystem 110 may also include a signal processing unit 339 configured to process incoming media content. Signal processing unit 339 may be configured, for example, to demodulate and parse encoded digital media content. In some examples, processing subsystem 110 may include one or more signal processing units 339 corresponding to each of the tuners 337. Content and/or data received from the media content provider 111 may be processed by signal processing unit 339, processor 338, and/or any other suitable component(s) of processing subsystem 110.

Processing subsystem 110 may include a graphics engine 340 configured to generate graphics that can be displayed by the display 112. The graphics may include graphical user interfaces such as, but not limited to, one or more program guide GUIs including various views of program guide data (i.e., program guide views), program guide navigation tools (e.g., a selector object), image objects representing media content instances, and other graphics.

One or more facilities (e.g., software applications) residing within processing subsystem 110 may be executed upon initiation by a user of the processing subsystem 110, or upon the occurrence of another predetermined event. The facilities may reside in memory 335 or in any other area of the processing subsystem 110 and may be executed by processor 338.

As shown in FIG. 3, processing subsystem 110 may include a program guide facility 342, which may reside in memory 335 or any other suitable location within processing subsystem 110. Program guide facility 342 may be configured to instruct one or more components of processing subsystem 110 (e.g., processor 338 and/or graphics engine 340) to generate and provide data representative of a program guide, at least one program guide image object, a selector object, and/or a program guide GUI including a view of at least a portion of the program guide and the image object. Processing subsystem 110 may provide the program guide GUI to display 112 for presentation to a user. The program guide GUI may include a view of at least a portion of a program guide, and thus may be used to present program guide views for experiencing by a user. Program guides, program guide GUIs, and/or program guide views may be generated from program guide data stored in processing subsystem 110 (e.g., in storage device 334) and/or program guide data received from an external source such as media content provider 111.

Program guide facility 342 may be launched or executed by receipt of a predetermined user input signal. For example, when a user selects program guide button 444 of user input device 113 shown in FIG. 4, program guide facility 342 may launch and instruct processor 338 and/or graphics engine 340 to generate a program guide GUI including data representative of a view of at least a portion of a program guide. The program guide GUI may be provided to output driver 333, which can provide a signal including data representative of the program guide GUI to display 112 for presentation to the user.

To facilitate an understanding of program guide facility 342, exemplary program guides, program guide GUIs, and program guide views, FIGS. 5-10 illustrate various respective examples of program guides, program guide GUIs, and program guide views that processing subsystem 110 may be configured to provide to display 112 for presentation to a user.

Figure 5:
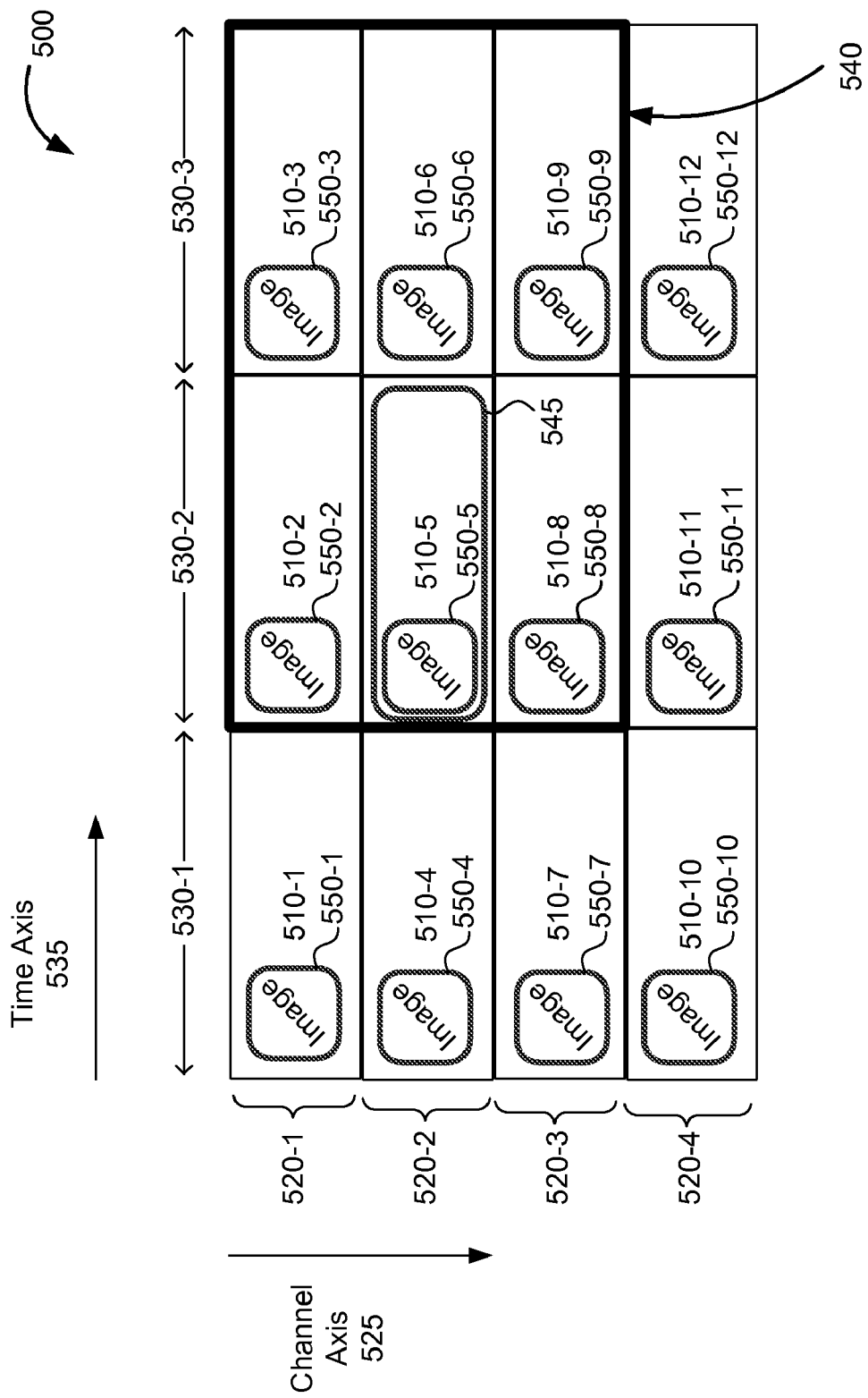
FIG. 5 illustrates an exemplary program guide having a matrix of cells and image objects included therein.

FIG. 5 illustrates an exemplary program guide 500 that may be generated and provided by processing subsystem 110. As shown in FIG. 5, program guide 500 may include a matrix of cells 510-1 through 510-12 (collectively "cells 510"). It will be recognized that while twelve cells 510 are shown in FIG. 5, program guide 500 may include any number of cells as may serve a particular application. The cells 510 may be associated with respective media content instances and related metadata and programming information. In certain embodiments, for example, any particular cell 510 may be associated with a media content instance. For instance, cell 510-1 may be associated with a television program titled "DALLAS."

The cells 510 may be arranged in a program guide matrix based on attributes of the cells and/or the associated media content instances. For example, the cells 510 may be arranged in a matrix based on content channels carrying the corresponding media content instances and time slots representing time periods during which the media content instances are scheduled for transmission (e.g., broadcast). As shown in FIG. 5, content channels 520-1 through 520-4 (collectively "content channels 520") may be arranged along a channel axis 525, and time slots 530-1 through 530-3 (collectively "time slots 530") may be arranged along a time axis 535 to form a matrix grid of cells 510. In the example shown in FIG. 5, the channel axis 525 is disposed vertically and the time axis 535 is disposed horizontally. This is illustrative only. Other dispositions of axes may be used in other embodiments.

In program guide 500, any particular cell 510 may be associated with a content channel and one or more time slots respectively indicative of the content channel carrying the corresponding media content instance and the time period during which the media content instance is scheduled for broadcast. As an example, the position of cell 510-1 in the program guide matrix represents that the corresponding media content instance (e.g., a television program titled "DALLAS") is scheduled for broadcast on content channel 520-1 during time slot 530-1. Accordingly, the cells 510 may be arranged in the matrix grid based on content channels 520 and time slots 530, and each matrix grid space may be spatially positioned as an intersection area for a particular content channel 520 and time slot 530.

Program guide 500 is illustrative only. Typically, a program guide may include numerous cells 510 associated with numerous media content instances, content channels 520, and time slots 530. To illustrate, a program guide may include program guide data representing scheduled programming for hundreds of content channels and for any suitable period of time, including one day, two weeks, or a month of programming, for example.

Accordingly, a user may view different portions of a program guide, and only a portion of a program guide is typically included in any one view presented to a user. FIG. 5 illustrates a viewing area 540 representing a particular view of program guide 500 (i.e., a "program guide view") that may be presented to a user. As shown, cells 510-2, 510-3, 510-5, 510-6, 510-8, and 510-9 are included in viewing area 540, and cells 510-1, 510-4, 510-7, 510-10, 510-11, and 510-12 are outside of the viewing area 540. The particular cells 510 included in the viewing area 540 in FIG. 5 are respectively associated with content channels 520-1, 520-2, and 520-3, and with time slots 530-2 and 530-3.

The portion of program guide 500 that is included in viewing area 540 may be determined based on a position of a program guide selector object 545 (or simply "selector 545").

FIG. 5 shows selector 545 positioned at cell 510-5. Media content processing subsystem 110 may be configured to move selector 545 to different cells 510 in the program guide 500 based on user input and to modify the program guide view presented in the viewing area 540 in response to the selector 545 changing positions in the program guide 500.

A cell, such as cell 510-5, selected by selector 545 may be referred to as an "active cell" or a "selected cell," and the other cells (e.g., cells 510-1, 510-2, 510-3, 510-4, 510-6, 510-7, 510-8, 510-9, 510-10, 510-11, and 510-12) not selected by selector 545 may be referred to as "inactive cells" or "unselected cells." Accordingly, the matrix of cells 510 in program guide 500 may include a selected cell and one or more unselected cells, with the selected cell being determined by the position of selector 545. The selected cell is typically within the viewing area 540. Accordingly, the cells 510-2, 510-3, 510-5, 510-6, 510-8, and 510-9 within the viewing area 540 may include a selected cell 510-5 and one or more unselected cells 510-2, 510-3, 510-6, 510-8, and 510-9.

As shown in FIG. 5, program guide 500 may include one or more image objects 550-1 through 550-12 (collectively "image objects 550") associated with one or more of the cells 510 in the program guide 500. In the example shown in FIG. 5, cells 510-1 through 510-12 include image objects 550-1 through 550-12, respectively.

As illustrated in FIG. 5, image objects 550 are not restricted only to a "selected cell"; one or more "unselected cells" may include image objects 550. In the example shown, each of the unselected cells 510-1, 510-2, 510-3, 510-4, 510-6, 510-7, 510-8, 510-9, 510-10, 510-11, and 510-12 includes a respective image object 550, and selected cell 510-5 also includes an image object 550-5.

Image objects 550 may include any visual images, graphics, and/or other image content (collectively referred to as "image content") representing media content instances associated with the cells 510. For example, image objects 550 may include still image content representing media content instances, including images of scenes, frames, posters, or promotions of the media content instances. As another example, image objects 550 may include video image content representing media content images, including a video component of at least a portion of a media content instance. For instance, a particular image object 550 may include presentation of all or part of a video component of an associated media content instance, or presentation of a trailer or other video promotion for the media content instance. Image objects 550 including image content may be referred to as "image thumbnails," and image objects 550 including video image content may be referred to as "video thumbnails."

Image content may be obtained from any suitable local or external source for inclusion in image objects 550. For example, image content may be locally stored in and retrieved from storage device 334 and/or live cache buffer 336. As another example, image content may be received from media content provider 111 or any other suitable external source. For instance, image content may be included in media content data streams and/or program guide data received from media content provider 111.

As mentioned, image content may include still image content and/or video image content. Video image content may include time-shifted content such as video-on-demand content and/or previously recorded and locally stored video streams (e.g., DVR content). Additionally or alternatively, video image content may include "live" or "nearly live" video streams being received from media content provider 111. Accordingly, an image object 550 may include a time-shifted video component of a media content instance, or an image object 550 may include a "live" or "nearly live" presentation of a video component of a media content instance being transmitted by media content provider 111. Hence, a user viewing a program guide view may be presented with video playback of "live," "nearly live," and/or prerecorded video components of one or more of the media content instances associated with one or more cells 510 included in a program guide view. The term "live," as used hereinafter and in the appended claims may refer to "live" and/or "nearly live" content. The term "time-shifted content" may refer to any content other than "live" content, including, but not limited to, on-demand content, prerecorded content, time-shifted video content (e.g., a time-shifted video stream), and buffered content.

A media content stream being received from the media content provider 111 may be buffered. The buffered stream may be stored in live cache buffer 336 as described above. When a media content stream is buffered, processing subsystem 110 may selectively include either buffered or live playback of a video component of the media content stream in an image object 550. The media content processing subsystem 110 may be configured to make this selection, or to allow a user to make the selection.

This may potentially provide a user with options for viewing the media content instance associated with the media stream. For example, when a user makes a selection in the program guide 500, such as selecting to watch a media content instance associated with a buffered media content stream in a full-screen view, the processing subsystem 110 may be configured to respond by providing a full-screen view of the media content. The full-screen view may include live playback of the media content stream, or the buffered media content stream may be used to initiate buffered playback of the media content at an earlier point in the media content stream, such as at approximately the beginning of the stream. As an example, a user may select a particular image object 550, and the buffered media content stream associated with the image object 550 may be used to present the media content to the user starting at the beginning of the media content stream.

In certain embodiments, when the user selects to launch a full-screen view of a media content instance that is being buffered (such as by selecting an image object 550 associated with the media content instance), processing subsystem 110 may provide selectable options enabling the user to select between viewing the live media content stream and using the buffered media content stream to initiate buffered playback at an earlier point in the media content stream, such as at the beginning. The selectable options may be presented in a pop-up graphical user interface or in any other suitable manner.

Image objects 550 may be used to order media content that is available for on-demand ordering. Image objects 550 associated with such media content instances may be selected to initiate a process for ordering on-demand media content, including media content that has been previously broadcast.

The configuration shown in FIG. 5 is illustrative only. Other embodiments may include other configurations of image objects 550 and/or cells 510. In certain embodiments, for example, only a subset of cells 510 includes image objects 550. This may be due at least in part to unavailability of image content for certain media content instances and/or to a lack or a conservation of resources. To illustrate, certain implementations of processing subsystem 110 may limit or regulate the number of media content streams that may be concurrently processed. For example, processing subsystem 110 may be configured to concurrently receive only a certain number of media content streams from media content provider 111. This may in turn limit the number media content instances that can be concurrently played back live within image objects 550. As an example, the number of live media content instances being concurrently presented in image objects 550 may be limited by the number of media content receivers (e.g., tuners 337 or IP receivers) in processing subsystem 110 and/or by the number of content channels (e.g., frequencies or IP channels) concurrently supported by the processing subsystem 110. Accordingly, in certain embodiments, only a certain number of image objects 550 may concurrently include live video image content.

Figure 6:
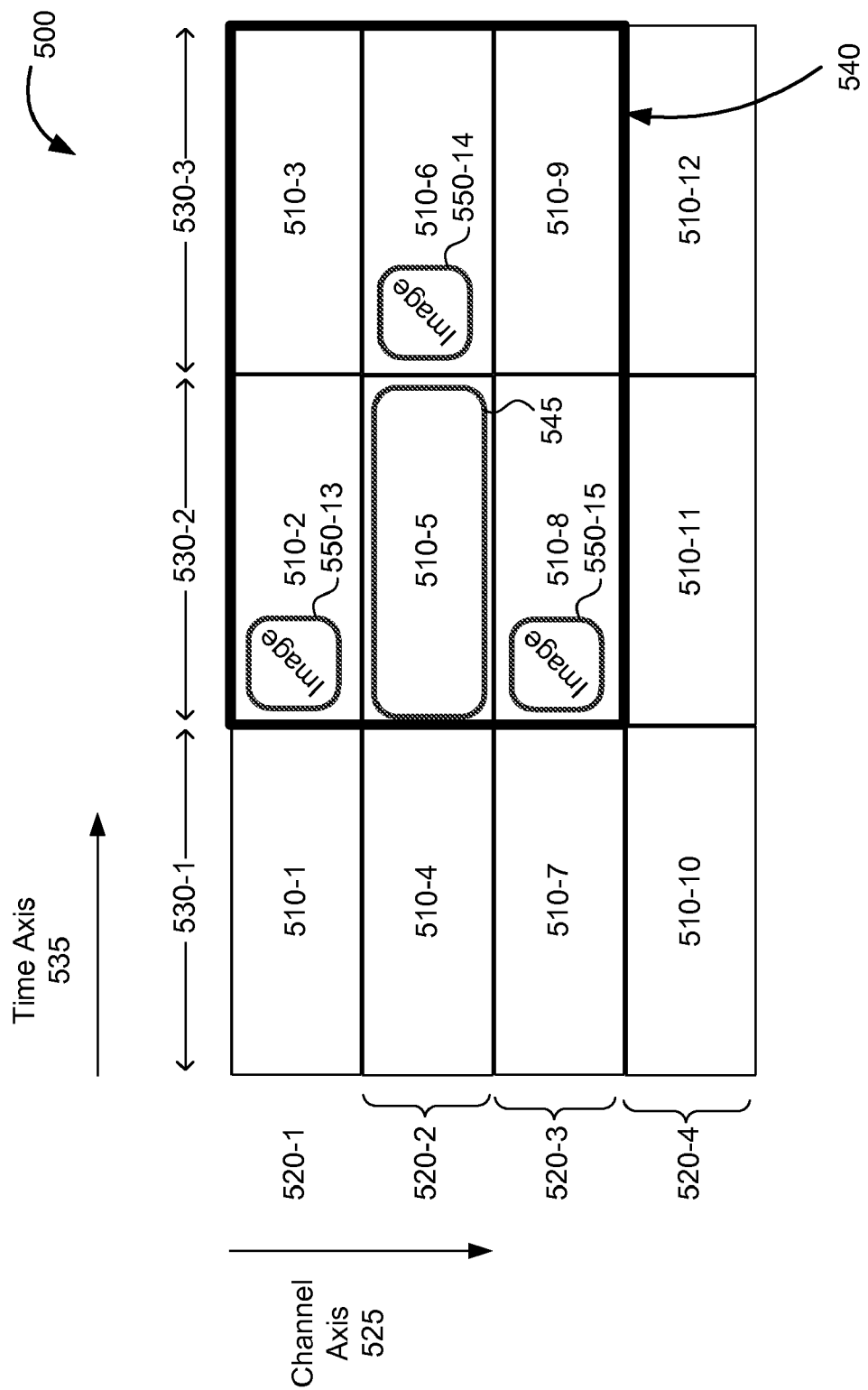
FIG. 6 illustrates another configuration of image objects within the program guide of FIG. 5.

FIG. 6 illustrates another exemplary configuration of image objects 550-13 through 550-15 in program guide 500. As shown in FIG. 6, in some embodiments, only a subset of cells 510 in program guide 550 or viewing area 540 includes image objects 550-13, 550-14, and 550-15. This may be for any of the reasons described above, including, but not limited to, unavailability of image content for certain media content instances and/or a lack or a conservation of resources.

Accordingly, one or more image objects 550 may be selectively placed in program guide 500 in accordance with a predefined placement heuristic. Program guide facility 342 may be configured to utilize the placement heuristic to selectively integrate image objects 550 into program guide 500, such as by stitching or otherwise associating image objects 550 with cells 510 in the program guide 500.

The placement heuristic may be defined to direct any suitable placement of image objects 500 as may serve a particular implementation. In certain embodiments, placement of image objects 500 may be based on one or more attributes of cells 510, selector 545, image content, media content instances, user profiles, and/or viewing area 540. Examples of such attributes may include, but are not limited to, cell 510 positions, selector 545 position, inclusion of cells 510 in or exclusion of cells 510 from viewing area 540, media content broadcast statuses (e.g., previously broadcast, currently being broadcast, and scheduled for future broadcast), image content types (e.g., still image, video image content, pre-recorded video content, or live video content), media content types (e.g., scheduled broadcast and available on-demand media content), user-defined preferences, and cell 510 positions relative to other cells 510, selector 545, content channels 520, time slots 530, and/or viewing area 540.

In certain embodiments, the placement heuristic may prioritize image content by type, such as by prioritizing video image content over still image content when resources are available for inclusion of video image content in image objects 550. As an example, for a particular image object 550-15 or cell 510-8, program guide facility 342 may determine whether video image content representative of the associated media content instance is available. If the video image content and appropriate resources are available, the program guide facility 342 may integrate the image object 550-15 including the video image content into the program guide 500 (e.g., within cell 510-8). If video image content for the media content instance or a resource is unavailable, program guide facility 342 may then determine whether still image content representative of the media content instance is available. If the still image content is available, the program guide facility 342 may integrate the image object 550-15 including the still image content into the program guide 500 (e.g., within cell 510-8). If no image content is available, the program guide facility 342 may omit the image object 550-15 from the program guide 500. Alternative or in addition to image object 550-15, cell 510-8 may include textual program guide information such as a title and/or a description of the media content instance.

In certain embodiments, the placement heuristic may prioritize placement of image content based on the viewing area 540. For example, image objects 550 may be included in cells within the viewing area 540 and omitted from other cells outside of the viewing area 540. This may help conserve resources by including image objects 550 only when the image objects 550 would be within the program guide area that is viewable by a user. As the program guide view is updated (e.g., due to movement of selector 545), the image objects 550 may also be updated. As another example, cells within the viewing area 540 may be considered before cells outside of the viewing area 540 for placement of image objects 550. The configuration shown in FIG. 6 may represent an exemplary placement of image objects 550-13, 550-14, and 550-15 based on the viewing area 540 and in which image objects 550-13, 550-14, and 550-15 are respectively associated with cells 510-2, 510-6, and 510-8 included within the viewing area 540, and no image objects 550 are included within other cells 510-1, 510-, 510-3, 510-4, 510-5, 510-7, 510-9, 510-10, 510-11, and 510-12 located outside of the viewing area 540.

In certain embodiments, the placement heuristic may prioritize placement of image content based on proximity to the selector 545. In program guide 500, for example, cells more proximate to the selector 545 may be prioritized over other cells for inclusion of image objects 550, or for inclusion of image objects 550 including video image content. Accordingly, cells more proximate than other cells to selector 545 may be given prioritized consideration for placement of image objects 550 and/or video image content. Such a placement heuristic may help place image objects 550 near an area of user focus, which is typically at or near to the selector 545.

As an example, in FIG. 6, cell 510-8 may be prioritized over cell 510-11, based on proximity to selector 545 in program guide 500, for placement of an image object 550 and/or for inclusion of video image content. The configuration shown in FIG. 6 may represent an exemplary placement of image objects 550-13, 550-14, and 550-15 based on proximity of the cells 510 to the selector 545.

Figure 7:
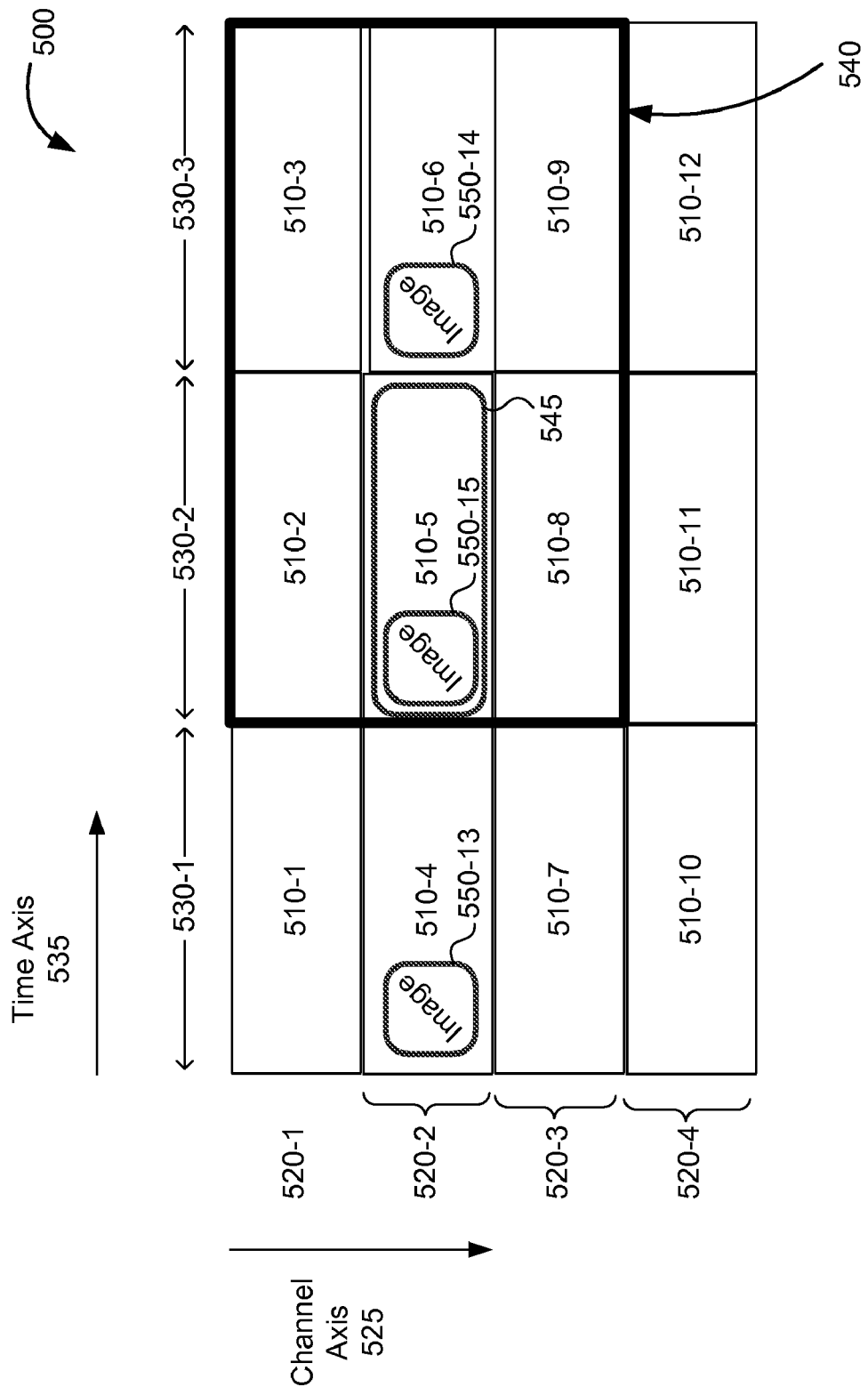
FIG. 7 illustrates yet another configuration of image objects within the program guide of FIG. 5.

In certain embodiments, the placement heuristic may prioritize placement of image content based on a content channel 520. In program guide 500, for example, cells 510-4, 510-5, and 510-6 associated with a particular content channel 520-2 in which selector 545 is positioned may be prioritized over other cells 510-1, 510-2, 510-3, 510-7, 510-8, 510-9, 510-10, 510-11, and 510-12 that are associated with other content channels 520-1, 520-3, or 520-4. FIG. 7 illustrates another exemplary configuration of image objects 550-13, 550-14, and 550-15 within program guide 500. As shown in FIG. 7, image objects 550-13, 550-14, and 550-15 may be positioned in a row of cells 510-4, 510-5, and 510-6 associated content channel 520-2. The configuration shown in FIG. 7 may be generated based on a placement heuristic that is configured to prioritize placement of image content based on a content channel 520.

Figure 8:
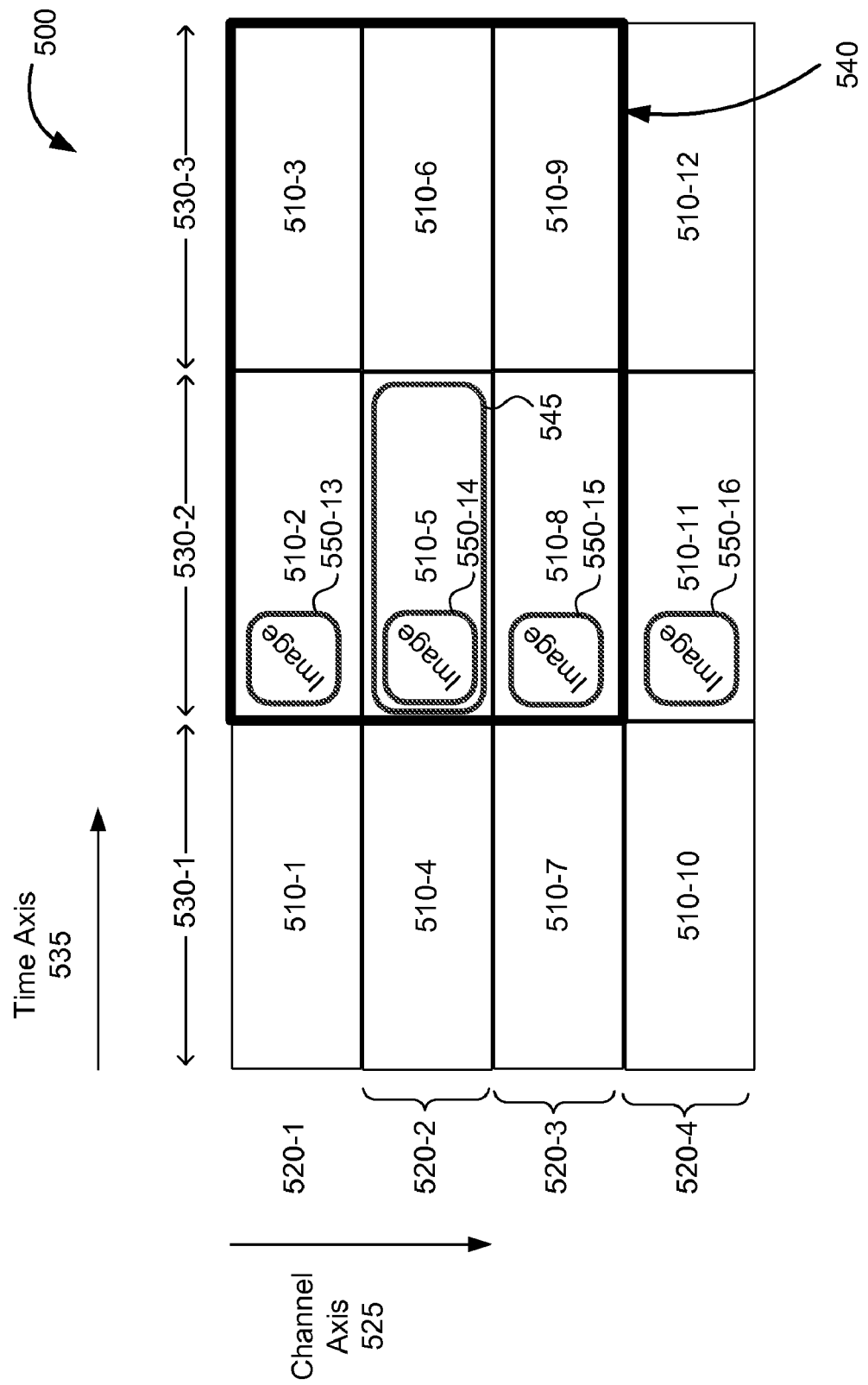
FIG. 8 illustrates yet another configuration of image objects within the program guide of FIG. 5.

In certain embodiments, the placement heuristic may prioritize placement of image content based on a time slot 530. In program guide 500, for example, cells 510-2, 510-5, 510-8, and 510-11 associated with a particular time slot 530-2 in which selector 545 is positioned may be prioritized over other cells 510-1, 510-3, 510-4, 510-6, 510-7, 510-9, 510-10, and 510-12 that are associated with other time slots 530-1 and 530-3. FIG. 8 illustrates another exemplary configuration of image objects 550-13, 550-14, 550-15, and 550-16 within program guide 500. As shown in FIG. 8, image objects 550-13, 550-14, 550-15, and 550-16 may be positioned in a column of cells 510-2, 510-5, 510-8, and 510-11 associated time slot 530-2. The configuration shown in FIG. 8 may be generated based on a placement heuristic that is configured to prioritize placement of image content based on a time slot 530.

In certain embodiments, the placement heuristic may place image content based on attributes of media content instances, including broadcast statuses of media content instances, for example. Broadcast statuses may include, but are not limited to, "previously broadcast" for media content instances that have already been broadcast, "currently broadcast" for media content instances that are currently being broadcast, and "scheduled future broadcast" for media content instances that are scheduled for broadcast in the future. The term "broadcast" is used broadly and may refer to various types of transmissions of media content.

In certain embodiments, the placement heuristic may direct that image objects 550 associated with "currently broadcast" media content instances may include video image content (e.g., live video image content) when such content and appropriate resources are available, and that other image objects 550 associated with "previously broadcast" and "scheduled future broadcast" media content instances include still image content when available.

As an example, in program guide 500, cells 510-2, 510-5, 510-8, and 510-11 within time slot 530-2 may be associated with media content instances that are being broadcast, cells 510-1, 510-4, 510-7, and 510-10 within time slot 530-1 may be associated with previously broadcast media content instances, and cells 510-3, 510-6, 510-9, and 510-12 within time slot 530-3 may be associated with media content instances scheduled for future broadcast. Accordingly, with reference to the configuration of image objects 550 shown in FIG. 5, image objects 550-2, 550-5, 550-8, and 550-11 respectively associated with cells 510-2, 510-5, 510-8, and 510-11 may include video image content, and image objects 550-1, 550-3, 550-4, 550-6, 550-7, 550-9, 550-10, and 550-12 respectively associated with cells 510-1, 510-3, 510-4, 510-6, 510-7, 510-9, 510-10, and 510-12 may include still image content, insofar as resources allow.

In certain embodiments, the placement heuristic may be configured to prioritize placement of image content based on one or more user preferences, which may be defined by a user of processing subsystem 110. Processing subsystem 110 may provide one or more tools enabling the user to define preferences for the placement of image content. As an example, a user may specify one or more particular media content instances to be given priority for placement of image content (e.g., video image content). Accordingly, the placement heuristic may be configured to prioritize one or more cells 510 associated with the media content instance(s) for placement of image content. This may allow a user to control allocation of resources such that image objects 550 and/or video image content are prioritized for preferred media content (e.g., a favorite television program).

The above example is illustrative only. A user may be allowed to provide other definitions for placement of image content. As another example, a user may specify a particular content channel 520 to be given priority for placement of image content. Accordingly, the placement heuristic may be configured to prioritize one or more cells 510 associated with the content channel 520 for placement of image content. This may allow a user to control allocation of resources such that image objects 550 and/or video image content are prioritized for a favorite content channel (e.g., ESPN). Other embodiments may include other user-defined placement priorities.

One or more of the above-described priorities for placing image content may be combined. Accordingly, the placement heuristic may include any combination or sub-combination of the above-described placement parameters. For example, a user-defined placement preference and a placement priority based on viewing area 540 may be combined such that both are considered and used to determine placement of image content in program guide 500.

Priority placement of image content may effectively allocate resources for image objects 550, and may be especially useful when resources are limited or regulated. For example, a particular implementation of processing subsystem 110 may support concurrent reception of a certain number media content streams from media content provider 111. Accordingly, only this number of image objects 550 may include live video image content from the media content streams. The placement heuristic may direct priority placement of the live video image objects 550. Other image objects 550 including other image content (e.g., prerecorded video and/or still image content) may next be placed in program guide 500 as resources allow.

Figure 9:
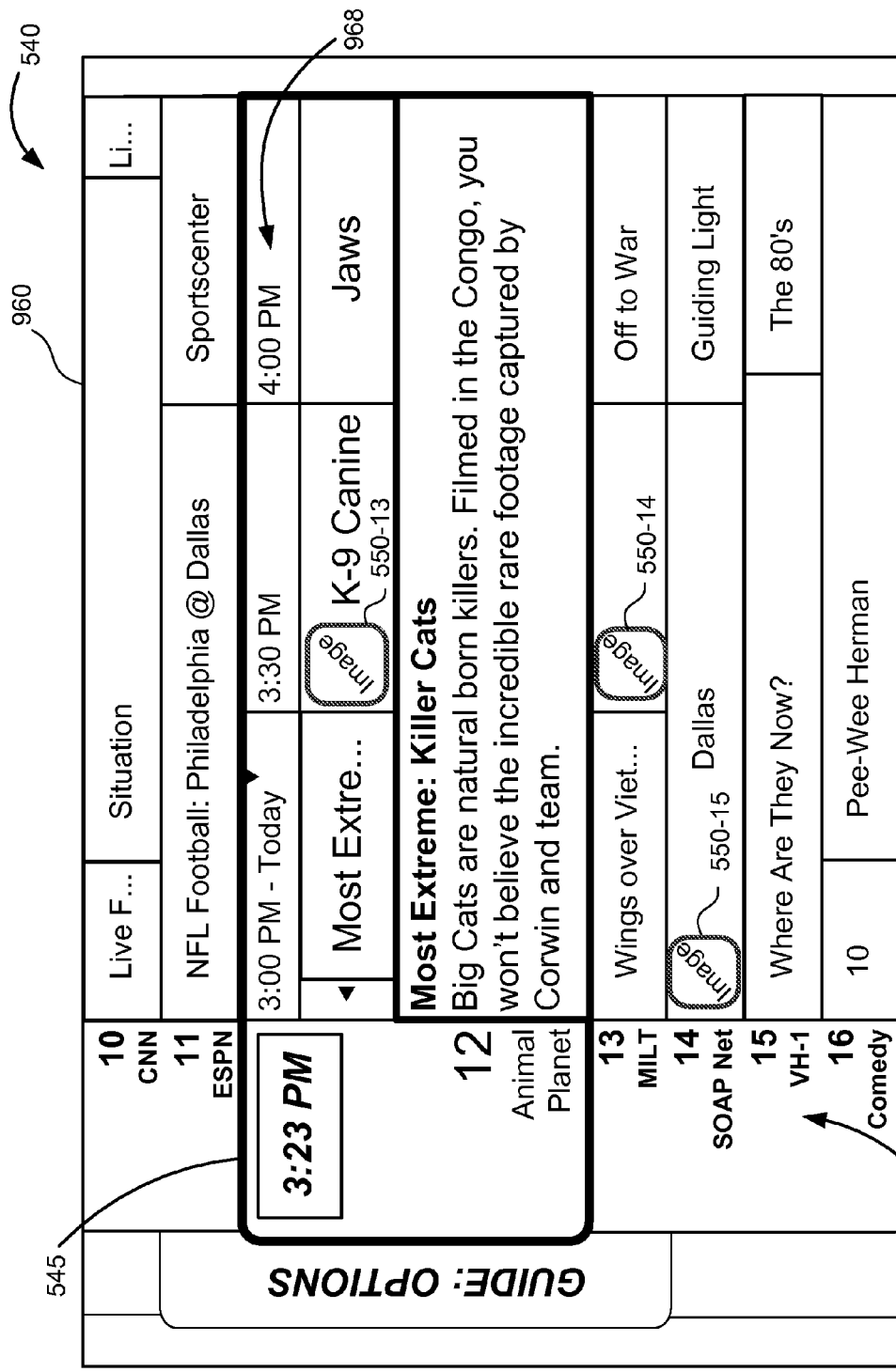
FIG. 9 illustrates an exemplary program guide view presented in a graphical user interface displayed in a viewing area of a display.

FIG. 9 illustrates an exemplary program guide graphical user interface ("GUI") 960, which may include a view of at least a portion of a program guide 500 and image objects 550-13, 550-14, and 550-15 included therein, as may be presented in a viewing area 540. Processing subsystem 110 may provide a signal carrying data representative of program guide GUI 960 to display 112 and for use by display 112 in presenting program guide GUI 960 for consideration by a user.

As shown in FIG. 9, program guide GUI 960 may include a list 964 of content channels 520, a list 968 of programming time slots 530, and a matrix of cells associated with media content instances and positioned relative to the content channels 520 and time slots 530.

Program guide GUI 960 may also include selector 545 configured to graphically depict which cell of the program guide matrix is currently highlighted. In FIG. 9, a cell associated with a media content instance titled "Most Extreme: Killer Cats" is highlighted by selector 545. When a cell is highlighted by selector 545, additional information associated with the cell may be displayed. For example, a synopsis of the "Most Extreme: Killer Cats" media content instance is displayed. The additional information may be obtained from metadata associated with the media content instance.

Selector 545 may be moved from cell to cell in accordance with user input commands. For example, the user may utilize buttons 445-449 of the user input device 113 shown in FIG. 4 to move the selector 545 up, down, left, or right, or to select a highlighted cell. When a highlighted cell is selected, the media content instance corresponding with the cell may be presented to the user in full-screen or other appropriate view. The view shown in program guide GUI 960 may be updated accordingly as selector 545 is moved about.

As shown in FIG. 9, program guide GUI 960 may include image objects 550-13, 550-14, and 550-15, which are respectively positioned in three "unselected cells" in the program guide GUI 960. The configuration of image objects 550-13, 550-14, and 550-15 shown in FIG. 9 is illustrative only and may be determined and generated in accordance with a placement heuristic, as described above.

Program guide GUI 960 may be part of a graphical layer that can be moved about in relation to viewing area 540 such that various portions of the layer are displayed within the viewing area 540. For example, the graphical layer may be moved toward the viewing area 540 to create a "zoom in" effect or away from the viewing area 540 to create a "zoom out" effect. This may be performed in any of the ways described in U.S. patent application Ser. No. 11/764,998, filed Jun. 19, 2007, and titled "Program Guide 3D Zoom," the disclosure of which is hereby incorporated by reference in its entirety.

Accordingly, the program guide GUI 960 110 may be moved such that the image content in any particular image object 555 is zoomed into and presented in a full-screen view. For example, a user may utilize user input device 113 to select image object 550-13, or the cell associated with image object 550-13. The processing subsystem 110 may, in response to the user input, move the graphical zoom layer with respect to the viewing area 540 such that the image content in image object 550-2 is zoomed into and presented in a full-screen view.

Figure 10:
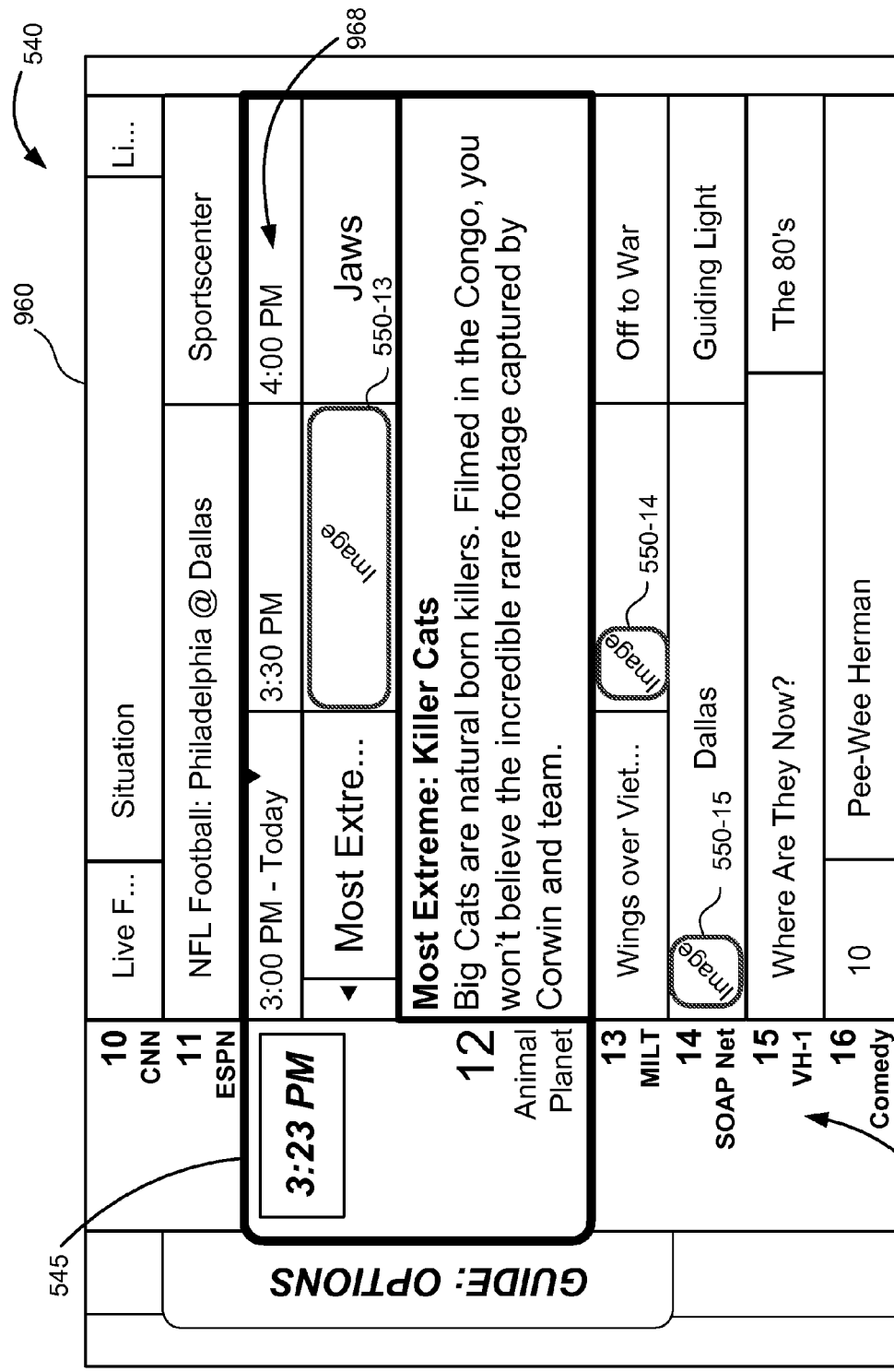
FIG. 10 illustrates another program guide view in the graphical user interface of FIG. 9.

In certain embodiments, an image object 550 may fill substantially all of the area of a cell and/or be the sole content of the cell. FIG. 10 illustrates another example of program guide GUI 960 in which image object 550-13 substantially fills the cell in which it is positioned. In the illustrated example, the size of the image object 550 has been adjusted (as compared to FIG. 9) to substantially fill the cell. In other embodiments, the size of the cell may be adjusted such that image object 550-13 substantially fills the cell. A reduction is cell size may allow cells to be repositioned and an increased number of cells to be concurrently displayed in view area 540.

While FIGS. 9-10 illustrate exemplary views of a program guide GUI 960, the examples are illustrative only. Image objects 550 may additionally or alternatively be included in other program guide GUIs generated by media content processing subsystem 110 in accordance with the principles described herein. For example, one or more image objects 550 may be included in a vertical calendar program guide GUI such as is described in U.S. patent application Ser. No. 11/959,939, filed the same day as the present application, and titled "Vertically Oriented Program Guide for Media Content Access Systems and Methods," the content of which is hereby incorporated by reference in its entirety.

Figure 11:
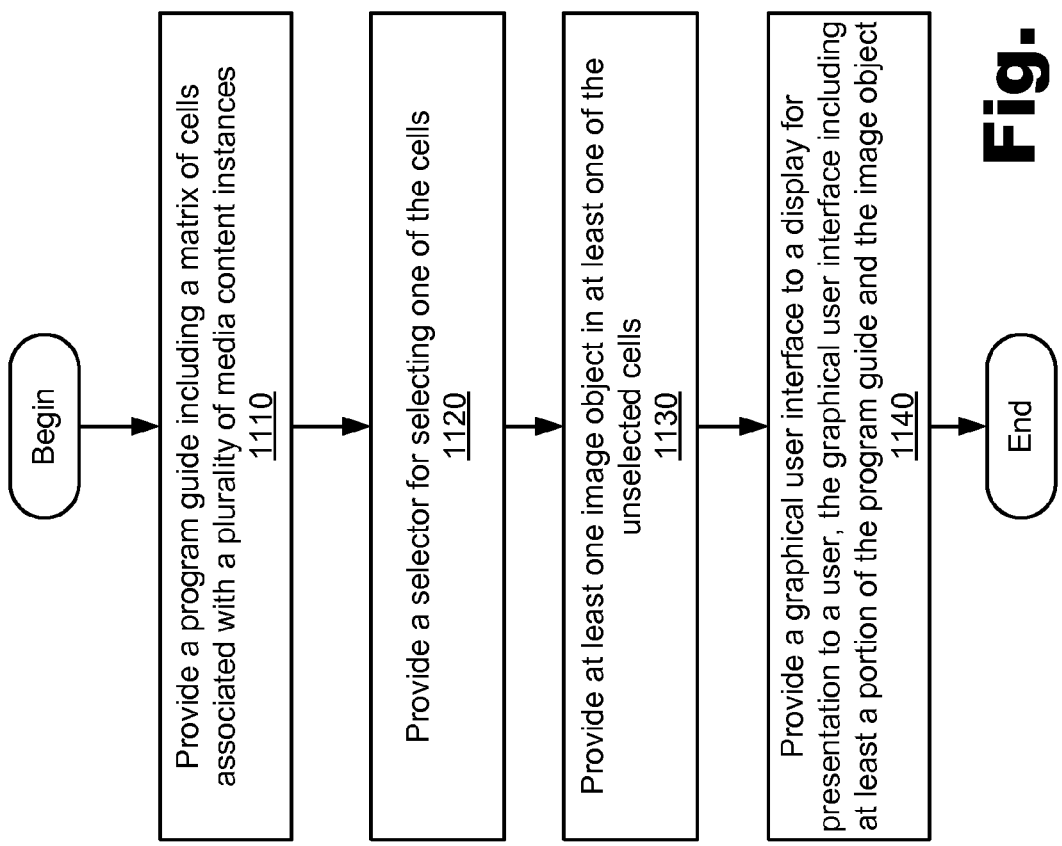
FIG. 11 illustrates an exemplary method of providing a program guide having image objects included therein.

FIG. 11 illustrates an exemplary method of providing a program guide having image objects included therein. While FIG. 11 illustrates exemplary steps according to one embodiment, other embodiments may omit, add to, reorder, and/or modify any of the steps shown in FIG. 11.

In step 1110, a program guide is provided. The program guide includes a matrix of cells associated with a plurality of media content instances. Step 1110 may be performed in any of the ways described above, including media content processing subsystem 110 generating and providing the program guide based on program guide data.

In step 1120, a selector (e.g., selector object 545) for selecting one of the cells in the program guide is provided. Step 1120 may be performed in any of the ways described above, including media content processing subsystem 110 providing selector 545 in program guide GUI 960.

In step 1130, at least one image object is provided in at least one of the unselected cells in program guide (i.e., one or more cells not selected by selector 545). Step 1130 may be performed in any of the ways described above, including selectively placing image objects and/or image content in one or more of the unselected cells in accordance with a predefined placement heuristic.

In step 1140, a graphical user interface is provided to a display for presentation to a user. The graphical user interface includes at least a portion of the program guide and at least one of the image objects provided in step 1130. Step 1140 may be performed in any of the ways described above, including media content processing subsystem 110 providing data representative of the graphical user interface to display 112.

As mentioned, step 1130 may include selectively placing image content in accordance with a placement heuristic. Cells in a program guide may be considered in a particular order for placement of image content based on the placement heuristic. As an example, cells within a viewing area 540 may be considered before cells outside of the viewing area 540. In certain embodiments, cells may be considered one at a time in an order determined by the placement heuristic.

Figure 12:
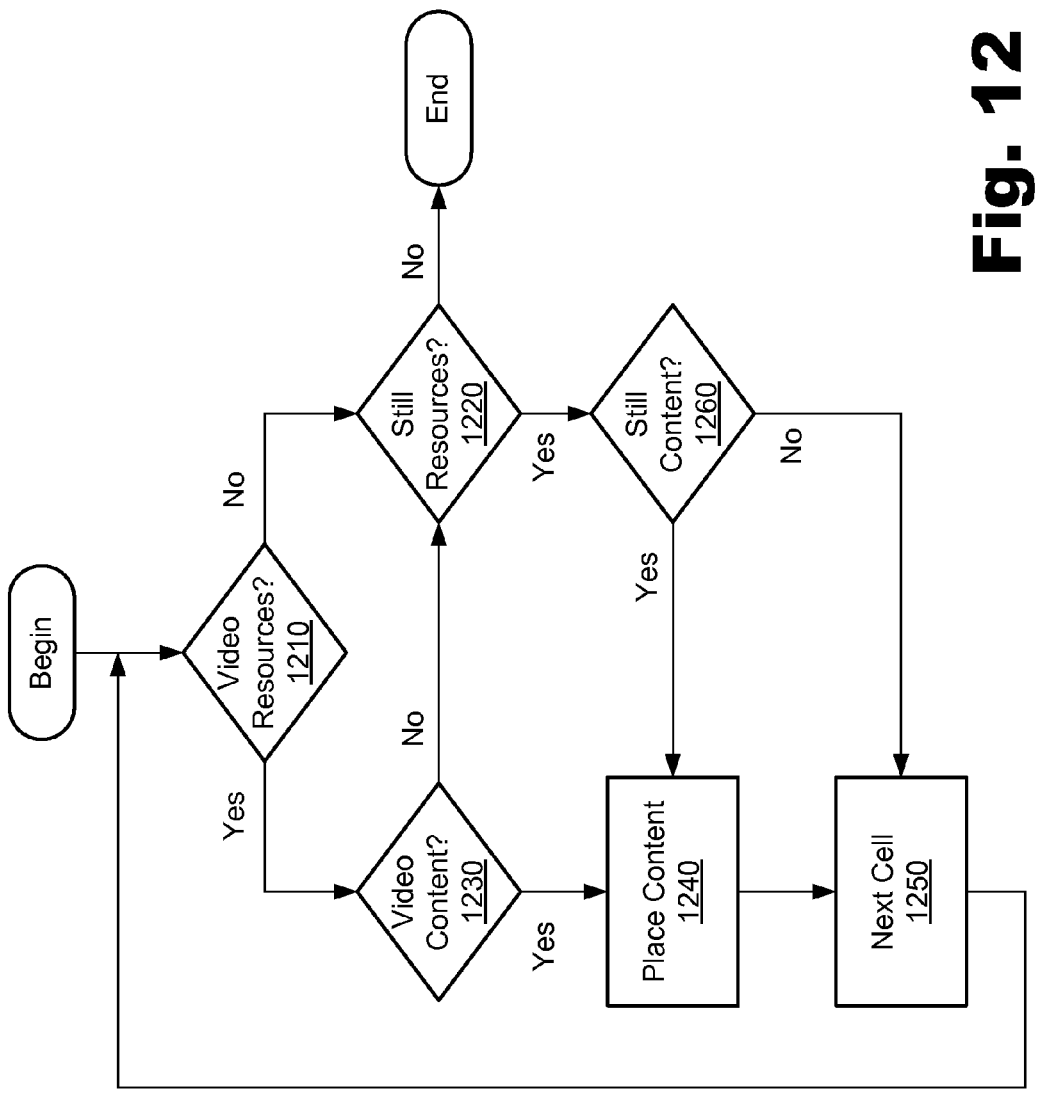
FIG. 12 illustrates an exemplary method of selectively placing image content at a cell level.

FIG. 12 illustrates an exemplary method of selectively placing image content at a cell level. While FIG. 12 illustrates exemplary steps according to one embodiment, other embodiments may omit, add to, reorder, and/or modify any of the steps shown in FIG. 12.

The illustrated method begins by considering a particular program guide cell for placement of image content. In step 1210, it is determined whether video image resources are available. Video image resources may include any hardware, software, and/or memory resources configured to enable placement of video image content in the cell. Step 1210 may include checking availability of video resources for live video and/or for prerecorded video.

If appropriate video image resources are not available, processing moves to step 1220. In step 1220, it is determined whether still image resources are available. Still image resources may include any hardware, software, and/or memory resources configured to enable placement of still image content in the cell. If appropriate still image resources are not available, the method ends.

Returning to step 1210, if it is determined that video image resources are available, processing moves to step 1230. In step 1230, it is determined whether there is video image content available for the cell. This may include determining whether video image content representing the media content instance corresponding to the cell is available.

If video image content is available for the cell, the video image content is placed in step 1240. This may include placing the video image content in an image object 550 and inserting the image object 550 in the cell of the program guide.

In step 1250, processing may move to another cell. The method of FIG. 12 may then be repeated for the next cell.

Returning to step 1230, if it is determined that video image content is not available for the cell, processing moves to step 1220. If it is determined in step 1220 that still image resources are available, processing moves to step 1260.

In step 1260, it is determined whether there is still image content available for the cell. This may include determining whether still image content representing the media content instance corresponding to the cell is available.

If still image content is available for the cell, the still image content is placed in step 1240. This may include placing the still image content in an image object 550 and inserting the image object 550 in the cell of the program guide.

Processing may then move to another cell in step 1250, and the method of FIG. 12 may be repeated for the next cell.

While the above examples are directed to image objects in program guide GUIs, image objects 550 may additionally or alternatively be included in other GUIs generated by media content processing subsystem 110 in accordance with the principles described herein. For example, one or more image objects 550 may be included in an interactive menu GUI (e.g., a media content search GUI and a menu control GUI) such as any of the GUIs described in U.S. patent application Ser. No. 11/956,605, filed Dec. 14, 2007, and titled "Content Level Navigation Systems and Methods," the content of which is hereby incorporated by reference in its entirety.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A system comprising:
   a media content processing subsystem configured to provide
      a program guide including a matrix of cells associated with a plurality of media content instances, said matrix of cells being arranged along a time axis and a channel axis,
      a selector object within said program guide, said selector object being configured to select one of said cells such that said cells in said matrix include a selected cell and a plurality of unselected cells,
      a first image selectively placed within a first unselected cell included in said plurality of unselected cells, said first image representing a first media content instance included in said plurality of media content instances and associated with a first time period and a channel corresponding to a first location of said first unselected cell along said time axis and said channel axis,
      a second image selectively placed within a second unselected cell included in said plurality of unselected cells, said second image representing a second media content instance included in said plurality of media content instances and associated with a second time period and a channel corresponding to a second location of said second unselected cell along said time axis and said channel axis, said second time period not overlapping said first time period;
   wherein said media content processing subsystem is further configured to
      generate at least one buffered content stream of a first media content stream and a second media content stream received from a media content provider communicatively coupled to said media content processing subsystem, said first media content stream representing said first media content instance and said second media content stream representing said second media content instance, and
      provide a graphical user interface to a display for presentation to a user, said graphical user interface including at least a portion of said program guide, said first media content stream displaying said media content instance as said first image, and said second media content stream displaying said media content instance as said second image.

2. The system of claim 1, wherein said first image comprises video image content representing said first media content instance.

3. The system of claim 2, wherein said video image content comprises playback of a video component of said first media content instance.

4. The system of claim 3, wherein said playback comprises live presentation of said video component of said first media content instance.

5. The system of claim 1, wherein said media content processing subsystem is further configured to detect a user selection of said first image, and initiate, in response to said user selection, playback of said first media content stream from approximately a beginning of said first media content stream using said at least one buffered content stream.

6. The system of claim 1, wherein said media content processing subsystem is further configured to detect a user selection of said first image, and provide, in response to said user selection, selectable options enabling said user to select from live full-screen playback of said first media content stream and buffered full-screen playback of said first media content stream using said at least one buffered content stream.

7. The system of claim 1, wherein said first image comprises a particular type of image, said type of image selected based on whether said first media content instance is a previously broadcast media content instance, a currently broadcast media content instance, and a scheduled future broadcast media content instance.

8. The system of claim 7, wherein said type of image includes video image content when said first media content instance is a currently broadcast media content instance and still image content when said first media content instance is a previously broadcast media content image or a scheduled future broadcast media content instance.

9. The system of claim 1, wherein said program guide is implemented in a graphical zoom layer, said graphical zoom layer enabling a zoom into said image to generate a full-screen view of said image on said display.

10. The system of claim 1, wherein said media content processing subsystem comprises a set-top box.

11. The system of claim 1, wherein said first image comprises a scene within said first media content instance.

12. The system of claim 1, wherein said first image is selectively placed within said first unselected cell based on proximity of a position of said first unselected cell relative to a position of said selector object in said program guide.

13. The system of claim 1, wherein said first image is selectively placed within said first unselected cell based on said first unselected cell being associated with a time slot in which said selector object is positioned in said program guide.

14. The system of claim 1, wherein said first image is selectively placed within said first unselected cell based on said first unselected cell being associated with a content channel in which said selector object is positioned in said program guide.

15. The system of claim 1, wherein:
   said first unselected cell is prioritized over a remainder of other unselected cells included in said plurality of unselected cells for selective placement of said first image in said first unselected cell based on a position of said first unselected cell relative to a position of said selector object in said program guide.

16. The system of claim 1, wherein said non-overlapping second time period occurs after an end of said first time period.

17. An apparatus comprising:
   at least one processor;
   a program guide facility configured to direct said at least one processor to
      generate a program guide including a matrix of cells associated with a plurality of media content instances, said matrix of cells being arranged along a time axis and a channel axis,
      provide a selector object within said program guide, said selector object being configured to select one of said cells such that said cells in said matrix include a selected cell and a plurality of unselected cells,
      selectively place a first image within a first unselected cell included in said plurality of unselected cells, said first image representing a first media content instance included in said plurality of media content instances and associated with a first time period and a channel corresponding to a first location of said first unselected cell along said time axis and said channel axis, selectively place a second image within a second unselected cell included in said plurality of unselected cells, said second image representing a second media content instance included in said plurality of media content instances and associated with a second time period and a channel corresponding to a second location of said second unselected cell along said time axis and said channel axis, said second time period not overlapping said first time period, and generate at least one buffered content stream of a first media content stream and a second media content stream received from a media content provider, said first media content stream representing said first media content instance and said second media content stream representing said second media content instance; and an output driver configured to provide a program guide graphical user interface to a display for presentation to a user, said program guide graphical user interface including at least a portion of said program guide, said first media content stream displaying said media content instance as said first image, and said second media content stream displaying said media content instance as said second image.

18. The apparatus of claim 17, wherein said first image comprises a of video content stream.

19. The apparatus of claim 18, wherein said video content stream includes a time-shifted video image stream.

20. The apparatus of claim 18, wherein said video content stream includes a live video image stream.

21. The apparatus of claim 20, further comprising a communication interface configured to receive said live video image stream from said media content provider.

22. The apparatus of claim 17, wherein said program guide is implemented in a graphical zoom layer, said graphical zoom layer enabling a zoom into at least one of said first image and said second image to generate a full-screen view of said at least one of said first image and said second image on said display.

23. A method comprising:
in response to a user instruction to display or modify display of program information
providing, by a media content processing subsystem, a program guide including a matrix of cells associated with a plurality of media content instances, said matrix of cells being arranged along a time axis and a channel axis;
providing, by said media content processing subsystem, a selector object within said program guide, said selector object being configured to select one of said cells in said matrix such that said cells in said matrix include a selected cell and a plurality of unselected cells;
selectively placing, by said media content processing subsystem, a plurality of images within a subset of said unselected cells, said plurality of images including a plurality of video image streams representing at least a subset of said media content instances, wherein a first image within said plurality of images within said subset of said unselected cells is associated with a first time period and a channel corresponding to a location of a first unselected cell in said subset of said unselected cells along said time axis and said channel axis and a second image within said plurality of images within said subset of said unselected cells is associated with a second time period and a channel corresponding to a location of a second unselected cell in said subset of said unselected cells along said time axis and said channel axis, said second time period not overlapping said first time period;
generating a plurality of buffered content streams of said plurality of video image streams; and
providing, by said media content processing subsystem, a graphical user interface to a display for presentation to a user, said graphical user interface displaying at least a portion of said program guide and said plurality video image streams within said first image and said second image.

24. The method of claim 23, wherein said plurality of video image streams comprises a plurality of live video image streams.

25. The method of claim 24, further comprising receiving, by said media content processing subsystem, said live video image streams from a media content provider, said live video image streams being components of said media content instances.

26. The system of claim 23, further comprising:
receiving, by said media content processing subsystem, a user selection of a chosen cell of said matrix of cells; and
if said chosen cell is one of said unselected cells within said subset of said unselected cells associated with at least one of said first time period and said second time period, displaying, by said media content processing subsystem, according to a user instruction, one of
a live version of said video image stream of said plurality of video image streams corresponding to the said media content instance associated with said chosen cell and
a buffered content stream of said plurality of buffered content streams corresponding to said media content instance associated with said chosen cell.

* * * * *